United States Patent
Weissman et al.

(10) Patent No.: US 9,027,003 B2
(45) Date of Patent: May 5, 2015

(54) PRECISE BRANCH COUNTING IN VIRTUALIZATION SYSTEMS

(75) Inventors: Boris Weissman, Mountain View, CA (US); Vyacheslav V. Malyugin, Los Gatos, CA (US); Petr Vandrovec, Mountain View, CA (US); Ganesh Venkitachalam, Mountain View, CA (US); Min Xu, Palo Alto, CA (US)

(73) Assignee: VMWare, Inc., Palo Alto, CA (US)

( * ) Notice: Subject to any disclaimer, the term of this patent is extended or adjusted under 35 U.S.C. 154(b) by 1689 days.

(21) Appl. No.: 12/059,894

(22) Filed: Mar. 31, 2008

(65) Prior Publication Data
US 2009/0249049 A1 Oct. 1, 2009

(51) Int. Cl.
G06F 9/44 (2006.01)
G06F 9/455 (2006.01)
G06F 11/34 (2006.01)

(52) U.S. Cl.
CPC ............ *G06F 9/455* (2013.01); *G06F 11/3414* (2013.01); *G06F 11/3476* (2013.01); *G06F 2201/86* (2013.01); *G06F 2201/88* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 5,488,716 A | * | 1/1996 | Schneider et al. | 714/10 |
| 6,772,410 B1 | * | 8/2004 | Komatsu et al. | 717/124 |
| 7,500,088 B2 | * | 3/2009 | Osawa | 712/240 |
| 7,844,954 B2 | * | 11/2010 | Venkitachalam et al. | 717/130 |
| 2003/0191792 A1 | * | 10/2003 | Waki et al. | 709/100 |
| 2004/0122834 A1 | * | 6/2004 | Durrant | 707/100 |
| 2004/0268348 A1 | * | 12/2004 | Waki et al. | 718/1 |
| 2010/0057932 A1 | * | 3/2010 | Pope et al. | 709/236 |
| 2012/0005460 A1 | * | 1/2012 | Inoue | 712/226 |

OTHER PUBLICATIONS

"ReVirt: Enabling Intrusion Analysis through Virtual-Machine Logging and Replay" by George W. Dunlap, 2002, pp. 1-14, [online][retrieved on Mar. 1, 2012]. Retrieved from <http://dl.acm.org/citation.cfm?id=844148>.*

VMware "Virtualizing Performance Counters" by Benjamin Serebrin, Oct. 30, 2011, pp. 1-11, [online][retrieved on Mar. 1, 2013]. Retrieved from <labs.vmware.com/download/143/>.*

* cited by examiner

*Primary Examiner* — Li B Zhen
*Assistant Examiner* — Evral Bodden

(57) ABSTRACT

A method for precisely counting guest branch instructions in a virtualized computer system is described. In one embodiment, guest instructions execute in a direct execution mode of the virtualized computer system. The direct execution mode operates at a first privilege level having a lower privilege than a second privilege level. A branch count of previously executed first privilege level branch instructions is maintained as instructions execute. Execution of a first privilege level branch instruction caused by a control transfer to the direct execution mode is detected. Responsive to the detection, a guest branch instruction count is determined based on the first privilege level branch count.

14 Claims, 11 Drawing Sheets

| | SOURCE ADDRESS | DESTINATION ADDRESS | EVENT TYPE |
|---|---|---|---|
| 1902 | vsAddr | vmmAddr | 'P' - SMI in V.S. (ignore) |
| 1904 | vsAddr | vmmAddr | 'P' - SMI in V.S. (ignore) |
| 1906 | pmiAddr | PMI Handler | 'T' - PMI dispatch event |
| 1908 | pmiAddr | pmiAddr | 'D' - SMI in DE (count) |
| 1910 | pmiAddr | pmiAddr | 'D' - SMI in DE (count) |

PRECISE BRANCH COUNTING IN VIRTUALIZATION SYSTEMS

BACKGROUND

A virtual machine is an abstraction—a "virtualization"—of an actual physical computer system. FIGS. 1A and 1B show two possible arrangements of virtualization software in a computer system 70 that implements virtualization. A virtual machine (VM) 20 or "guest" is installed on a "host platform," or simply "host," which will include system hardware 10 and virtualization software 80, which comprises one or more layers or co-resident components including system-level software, such as an operating system or similar kernel, or a virtual machine monitor or hypervisor as described in more detail below, or some combination of these. The system hardware typically includes one or more processors 11, memory 13, some form of mass storage 14, and various other devices 17.

In the conceptualization of virtual machines shown in FIGS. 1A and 1B, each VM 20 includes both virtual system hardware 28 and guest system software 29. The virtual system hardware typically includes at least one virtual CPU 21, virtual memory 23, at least one virtual disk 24, and one or more other virtual devices 27. It should be understood that the various virtualized hardware components of virtual system hardware 28 are merely conceptual representations of an execution environment for the guest operating system and applications. As suggested by the dashed box indicating the virtual system hardware 28, components of virtual system hardware 28 do not exist as physical or software entities, but instead are actually implemented by virtualization software 80 using known techniques to emulate the corresponding physical components. While the components of virtual system hardware 28 are implemented by virtualization software 80, the state of these components forms part of the state of VM 20, and are therefore represented within VM 20. Guest system software 29 includes a guest operating system (OS) 22 and drivers 25 as needed for the various virtual devices.

A single VM may be configured with one or more than one virtualized processor. Symmetric multi-processor (SMP) systems can be virtualized so that each VM can access the resources of multiple virtual processors, which may be mapped to one (using time-slicing) or more than one physical processor of the host platform. In this manner, each guest VM executes on system hardware 10 and physical CPU(s) 11 in its own "context," which is provided by virtualization software 80. A "context" generally includes the state of all virtual address space, as well as the set of registers (including privilege registers), with all hardware exception and entry points. Thus, although they share system resources, each guest VM is isolated from one another and from the virtualization software. Applications 26 running on each VM may function substantially as they would if run directly on a physical computer, even though the applications are running at least partially indirectly. Executable files may be accessed by guest OS 22 from the virtual disk 24 or virtual memory 23, which are mapped to portions of the actual physical disk 14 or memory 13, respectively, which portions are allocated to that VM by virtualization software 80. The design and operation of virtual machines are well known in the field of computer science.

Virtualization software 80, also referred to herein as "virtualization software layer," or "virtualization layer," may include one or more software components and/or layers, possibly including one or more of the software components known in the field of virtual machine technology as "virtual machine monitors" (VMMs), "host operating systems," or virtualization "kernels." As used herein, the term, "virtualization software" refers generally to software that enables virtualization in a virtual computer system. Virtualization software 80 is generally located logically between all virtual machines and the underlying hardware platform and/or system-level host software. FIGS. 1A and 1B show one or more virtual machine monitors that appear as separate entities from other components of the hypervisor and perform functions as described in more detail below. Those skilled in the art may recognize that such a representation of these components is provided only for the sake of simplicity and clarity and by way of illustration. The distinctions between and among the various components of a virtualization system are not always so clear-cut, and the use of the term "virtual machine monitor" or just "VMM" is meant to encompass the component(s) in the virtualization software that perform the indicated functions, regardless of what name they are given.

Computer system 70 may be fully virtualized or para-virtualized. As the term implies, a "para-virtualized" system is configured in some way to provide certain features that facilitate virtualization. For example, guest operating system 22 may be designed to avoid hard-to-virtualize operations and configurations. For example, the guest operating system may be written so that it avoids certain privileged instructions, certain memory address ranges, etc. As another example, a para-virtualized system may include an interface within the guest that enables explicit calls to other components of the virtualization software. The phrase "degree of virtualization" refers generally to the extent to which the guest operating system is specialized to support virtualization.

FIG. 1A shows a "non-hosted" configuration, whereas FIG. 1B shows a "hosted" configuration. The non-hosted configuration illustrated in FIG. 1A deploys one or more VMMs 30-30n on top virtualization kernel 60. Kernel 60 is constructed specifically to provide efficient support for VMMs 30-30n. In particular, kernel 60 includes device drivers to manage and control physical system hardware 10, and to assign and distribute resources to VMMs 30-30n. A console operating system 42 and associated applications 43 may be provided to e.g., as a boot-loader for kernel 60, to provide a user interface to allow a user (e.g., an administrator) control over the operation of kernel 60, and/or to interact with applications executing on each of the virtual machines. Of course, administrative functions of kernel 60 and VMs 20 may be accessed remotely via a network.

In the hosted configuration shown in FIG. 1B, VMMs 30-30n run directly on the hardware platform along with host operating system 50. In a hosted virtualized computer system, an existing, general-purpose operating system forms "host" operating system 50 that is used to perform certain input/output (I/O) operations, alongside and sometimes at the request of a VMM. In this configuration, host operating system 50 includes driver 58 and one or more executable applications 56 that serve a number of virtualization functions, including provide an data interface between VMMs 30-30n and physical devices, manage and distribute system resources, and provide user interfaces to virtualization system and the inputs and outputs to each of the virtual machines. Host operating system 50, installed drivers 54, VM applications 56, along with other user applications 43 form host system software 52. The Workstation product of VM ware, Inc., of Palo Alto, Calif., is an example of a hosted, virtualized computer system, which is also explained in U.S. Pat. No. 6,496,847 (Bugnion, et al., entitled "System and Method for Virtualizing Computer Systems"). Thus, the term "host" in this particular context refers to the host operating system that is used to support a virtual machine, whereas, generally speaking, it refers to the physical host platform on which the virtual machine resides.

With respect to terminology, it should be noted that kernel 60 shown in the non-hosted system in FIG. 1A is not the same as the operating system kernel within the guest operating system 22. As is well known, every operating system has its own kernel. Note also that kernel 60 is part of the "host" platform of the VM/VMM as defined above even though the configuration shown in FIG. 1A is commonly termed "non-hosted." Kernel 60 may be considered to be both part of the host platform and part of the virtualization software. The difference in terminology is one of perspective and definitions that are still evolving in the art of virtualization.

A virtual machine environment provides a convenient platform for efficient logging and replay of execution. Logging and replaying the execution of a virtual machine has several applications such as, for example, debugging, fault tolerance, and trace driven simulations. For example, logging and replaying allows a computer architect to perform detailed analysis of run-time information in an offline environment using trace simulations. Logging and replay can also be used to improve fault tolerance by enabling a virtual machine to recover from a system error by replaying execution from the last known save point. With regard to debugging, logging and replaying allows an analyst to identify what causes software bug to occur by recording the computer operation when the error is reproduced, and then stepping through the execution while reviewing the system state at each step to identify the cause.

Injecting recorded non-deterministic events at the correct time during playback of execution requires precisely counting instructions and branch occurrences to ensure fidelity of the playback with the original execution. Unfortunately, due to limitations of processor architecture, prior attempts at accurately counting execution branches has not been wholly successful. Accordingly, there is a need for a method for precisely counting branch instructions, e.g., for logging and replaying execution in a virtualized computing environment.

SUMMARY

A computer-implemented method, computer program product, and virtualized computer system for counting guest branch instructions. A first embodiment executes guest instructions in a direct execution mode. The direct execution mode operates according to a first privilege level lower in privilege than a second privilege level. A first privilege level branch count of previously executed first privilege level branch instructions is maintained as instructions execute. Execution of a first privilege level branch instruction caused by a control transfer to the direct execution mode is detected. Responsive to the detection, a guest branch instruction count is determined based on the first privilege level branch count.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teaching of the disclosed embodiments can be readily understood by considering the following detailed description in conjunction with the accompanying drawings.

DETAILED DESCRIPTION OF EMBODIMENTS

The Figures and the following description relate to embodiments by way of illustration only. It should be noted that from the following discussion, alternative embodiments of the structures and methods disclosed herein will be readily recognized as viable alternatives that may be employed without departing from the disclosed principles.

Reference will now be made in detail to several embodiments, examples of which are illustrated in the accompanying Figures. It is noted that similar or like reference numbers may be used in the Figures to indicate similar or like functionality. The Figures depict embodiments for purposes of illustration only. One skilled in the art will readily recognize from the following description that alternative embodiments of the structures and methods illustrated herein may be employed without departing from the principles described herein.

The disclosed embodiments may be used to advantage in both a hosted and a non-hosted virtualized computer system, regardless of the degree of virtualization, in which the virtual machine(s) have any number of physical processors. The disclosed embodiments may also be implemented directly in a computer's primary operating system (OS), both where the OS is designed to support virtual machines (i.e., for para-virtualization) and where it is not.

Figure 2:
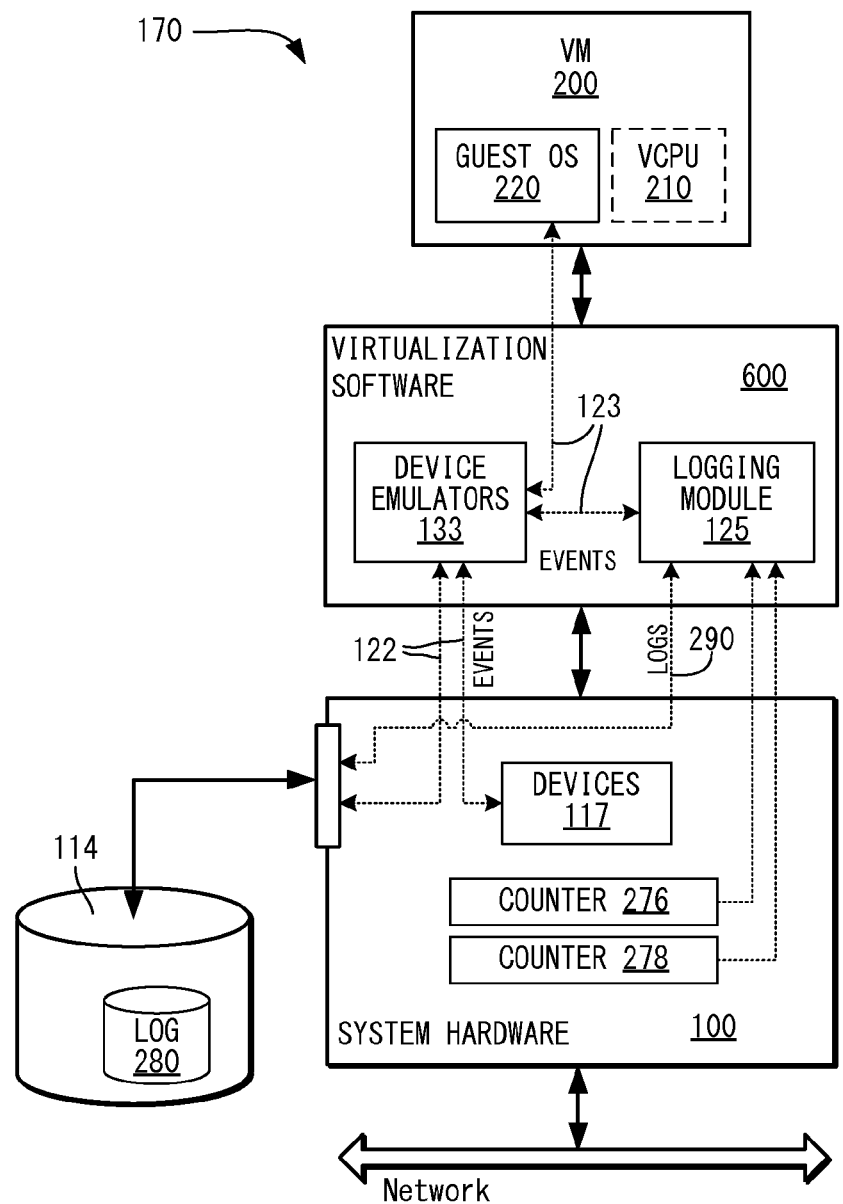
FIG. 2 illustrates a virtualized computer system providing record and replay functionality.

FIG. 2 illustrates a virtualized computer system providing record and replay functionality to a VM 200. In this configuration, instructions making up guest software from VM 200 may be executed at the direction of virtualization software 600 either by software emulation, by machine translation, or direct execution or hardware virtualization as described below with reference to FIG. 4. When recording execution of VM instructions, non-deterministic events 122 (also referred to as "asynchronous events" may be generated, e.g., by disk 114, other physical devices 117, or virtual devices, e.g., residing in different virtual machines but on the same host (not shown), which may be communicating with each other solely using virtual NICs. Each of physical devices 117 as well as disk 114 may be shared with other VMs (not shown) or with the system-level software, including portions of virtualization software 600. When events generated by physical devices, such as disk I/O, network I/O, user interface I/O, etc., are mapped to VM 200 by virtualization software, the events may be routed to device emulators 133, which raise interrupts that are then provided to guest OS 220 in VM 200 in a manner well known in the field of computer virtualization. Not all asynchronous events raise interrupts that are dispatched to the guest. For example, an event can cause any asynchronous guest state change such as a change in memory contents, change in virtual device state, etc., as well as asserting interrupts.

In system 170, logging module 125, which also resides in or forms a part of virtualization software 600, captures all non-deterministic events geneated outside and inside the virtual processor (including all virtual devices). After non-deterministic events 123 are captured by logging module 125, logging module 125 then passes log entries 290 identifying the event along with an identification of the execution point to log 280 in disk 114. The identification of the execution point is ascertained using hardware performance counters 276, 278, as described in further detail below.

During a subsequent replay of a previously recorded execution, logging module 125 retrieves log entries identifying non-deterministic events from log 290 in disk 114 and tracks execution of VM 200 with the aid of hardware performance counters 276, 278. When an execution of VM 200 reaches a point corresponding to a non-deterministic event recorded in a log entry, logging module 125 injects the event 123 into a corresponding device emulator 133, which responds appropriately to the event. The manner of injecting an event is well known in the field of computer virtualization. Recording and replaying VM execution in this manner can be useful to computer architects when performing offline analysis of an execution sequence, permitting them to peek into the state of internal registers at each stage of execution.

Rather than storing log entries to disk 114, it is also possible to pass the log entry to a second computer or to a logging server (not shown) external to system 170. For example, in a fault tolerance application, a secondary (backup) VM (not shown) can be configured to receive the log entries. In this case, the secondary VM may be configured to take over almost instantaneously if primary VM 200 fails in fault tolerance applications.

Figure 1A:
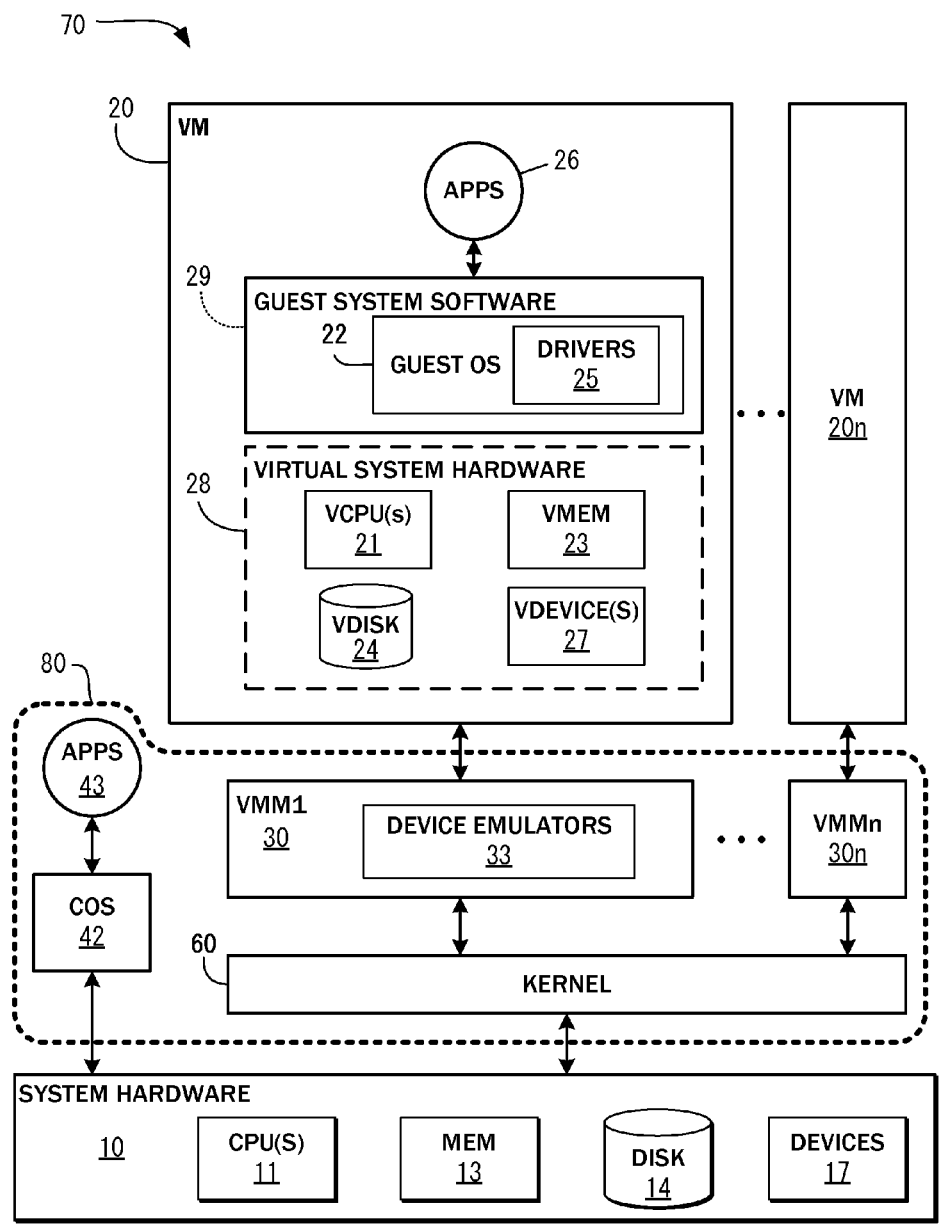
FIGS. 1A and 1B illustrate a non-hosted and hosted virtualized systems, respectively.
Figure 1B:
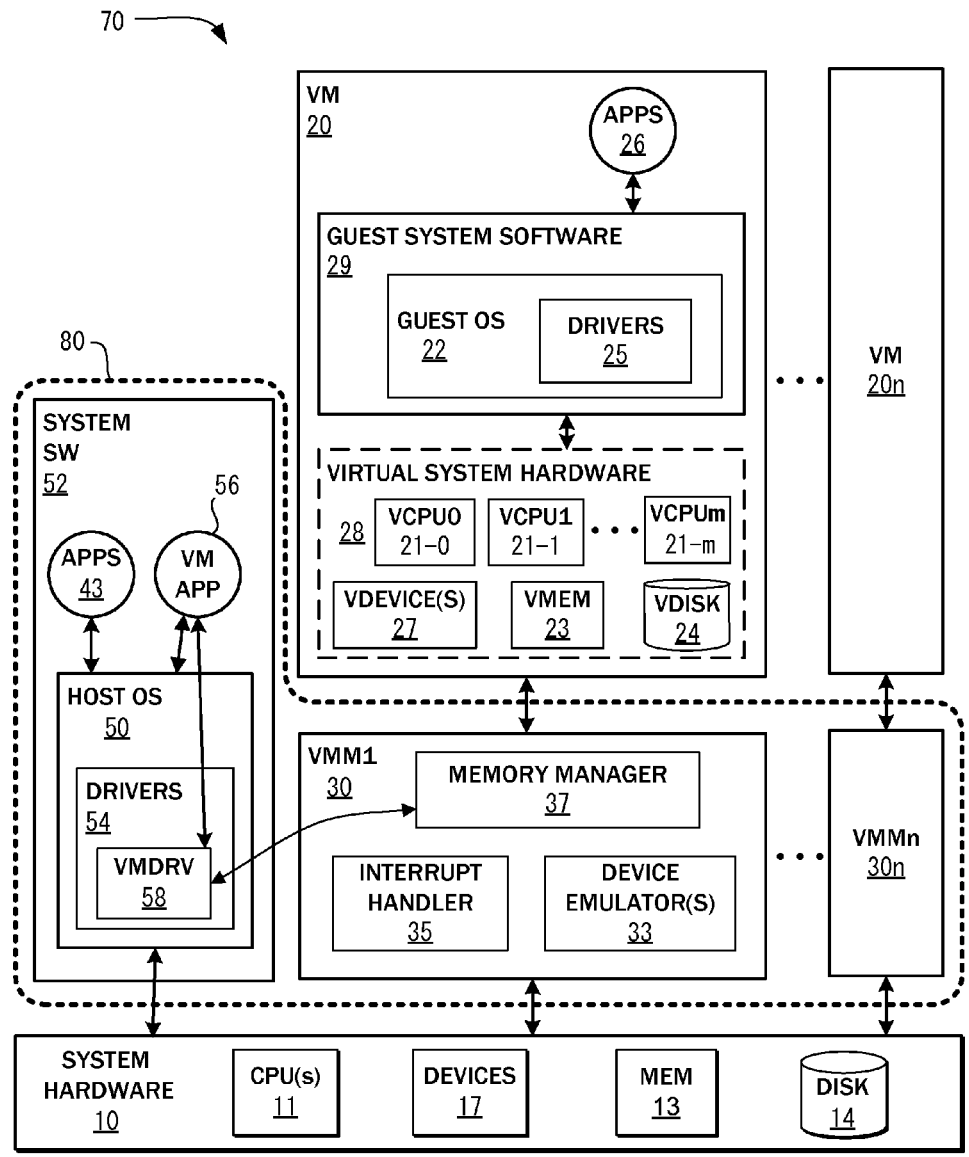

It should be recognized that virtualization software 600 may be implemented using a non-hosted configuration such as that shown in FIG. 1A, a hosted configuration such as that shown in FIG. 1B, or other virtualization configuration which may have attributes of either or both hosted and non-hosted configurations. Furthermore, virtualized computer system 170 may be designed according to any virtualization paradigm including full virtualization, partial virtualization, para-virtualization, etc., and as described above with reference to FIGS. 1A and 1B. For example, in a non-hosted system, device emulators 133 may reside in a VMM layer whereas logging modules 125 may reside in a VM kernel, or both may reside in a VMM.

To log execution, virtualization software 600 logs non-deterministic events beginning from a known state of VM 200 and stores the non-deterministic events to event log 280. Event log 280 may also include an indication of the known state from which the logged events begin. The known state may be, for example, the initial power up state of the system or a system "checkpoint." A checkpoint is a stored data structure that captures the system state including register values, memory content, etc. Non-deterministic events are events that cannot be predicted based solely on the current state. Non-deterministic events may include, for example, disk transfer events, serial port events, parallel port events, network packet events, keyboard events, etc. Event log 280 includes data and timing information of the non-deterministic events for a particular execution of VM 200. During logging, virtualization software 600 detects each non-deterministic event and stores each event in event log 280 together with a current execution point. The execution point is a measure of progress of VM 200 from a known state of the VM 200-1 and is used as a timing mechanism to record precisely when the event occurs in the execution.

Replay operates on the principle that a VM recording a specific execution and a VM that is replaying the same execution must produce the same sets of outputs given the same sets of inputs at the same time relevant. During replay, VM 200 begins executing from a known state at a starting execution point, and each non-deterministic event is inserted into the execution sequence based on the log entries in event log 280. Each non-deterministic event is inserted into the replayed execution sequence at the same execution point as in the captured execution sequence. By logging only non-deterministic events, the logging and replay system advantageously stores a minimal execution log. This reduces software overhead and storage requirements and improves performance.

In order to accurately monitor the timing of external (non-deterministic) events during logging, logging module 125 precisely identifies an execution point at which the non-deterministic event occurred. In one embodiment, the execution point represents a particular execution of an instruction in the stream of instructions executed by VM 200. The execution point is logged with the event and indicates precisely when the event occurred in the stream of executed instructions. During replay, logging module 125 monitors the execution point of the replayed instructions and compares the current execution point to the logged execution points corresponding to the non-deterministic events. Execution by VM 200 is stopped at the logged execution point so that the logged event can be injected to the execution stream at the right execution point. By accurately inserting logged events during replay at the right execution point, the system ensures that the replayed execution will generate the same set of outputs as the originally logged execution. It should be noted that recording operations and replaying operations need not be performed on the same computing system 170. An event log 280 recorded by one computing system 170 may be used to reproduce the execution on a second computing system 170 or a second VM within the same computing system.

In an x86 IA-32 architecture, the execution point can be precisely identified by the tuple [eip, brCnt, ecx], where eip is an instruction pointer, brCnt is a branch counter, and ecx is an iteration counter. For processors that support 64-bit extensions of x86 such as AMD64, the tuple is extended to contain 64-bit registers: [rip, brCnt, rcx]. Although the 32-bit register names [eip, brCnt, ecx] are used throughout the description, their 64-bit counterpart registers [rip, brCnt, rcx] can be substituted where applicable without affecting the accuracy of the disclosure.

Figure 3:
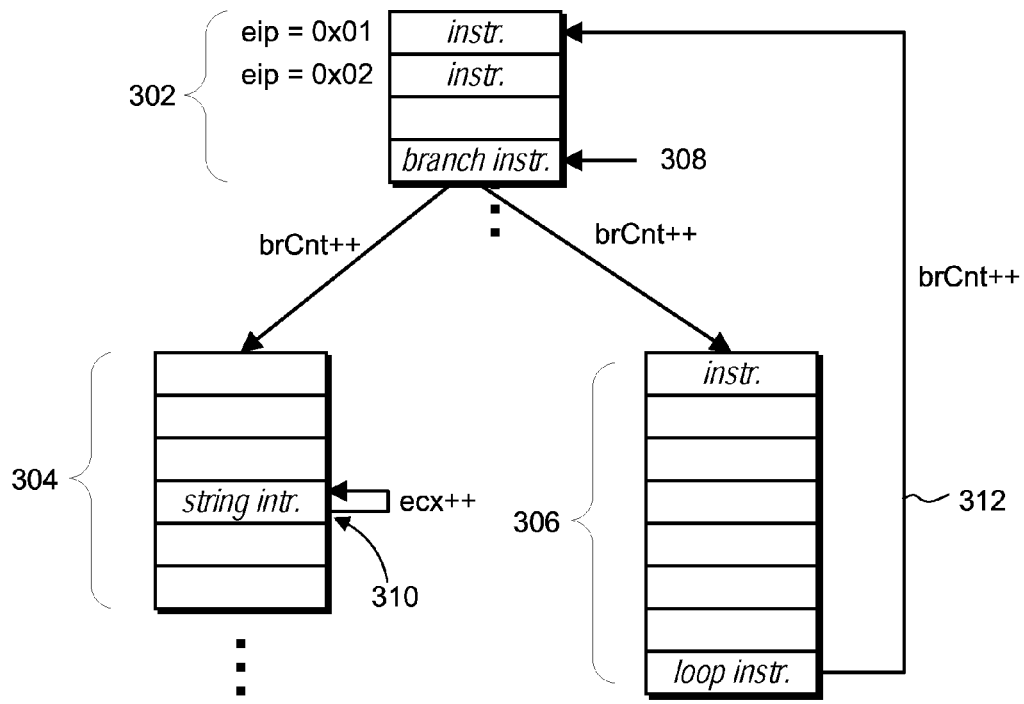
FIG. 3 illustrates an exemplary structure of a computer program in an x86 processor architecture.

FIG. 3 provides, by way of example, a structure of executable instructions (basic blocks) and illustrates how the execution point can be precisely tracked. Each instruction is stored at a particular memory location in virtual memory of the VM 200 and is referenced by the instruction pointer (eip). Typically, the instruction pointer is automatically incremented following execution of the referenced instruction and the next instruction is then executed. For example, in block 302, VM 200 executes an instruction at memory location 0x01 referenced by the instruction pointer (eip). The instruction pointer (eip) is then automatically incremented to reference the instruction at memory location 0x02, and so on. Because execution of a computer program is often iterative, however, the instruction pointer (eip) may reach the same value multiple times during execution of a program. For example, a loop 312 may cause block 302 to execute multiple times. Each time instructions in block 302 are executed, the instruction pointer (eip) loops through the same sequence of values (0x01, 0x02, etc.).

In order to distinguish between different iterations of the same instruction, virtualization software 600 also maintains a branch counter (brCnt). The branch counter (brCnt) represents the total number of branch instructions executed by VCPU 210 from the beginning of logging or replay. A branch instruction includes any instruction that interrupts the normal incremental update of the instruction pointer (eip) and causes the instruction pointer (eip) to instead jump to a particular instruction elsewhere in virtual memory 230. For example, branch instruction 308 may represent a conditional branch that causes the instruction pointer (eip) to jump to either block 304 or block 306 depending on the current system state. A branch instruction may also correspond to, for example, a loop instruction, a subroutine call, or a system instruction such as IRET or INTn.

Some types of instructions (e.g., instructions with 'rep' prefixes such as a string instruction 310) are executed multiple times by VCPU 210. These instructions execute multiple times without updating the branch counter (brCnt) or the instruction pointer (eip). In x86 architecture, each iteration of such an instruction is automatically counted by the iteration counter (ecx). For example, string instruction 310 executes multiple times with each iteration decrementing the iteration counter (ecx). As will be apparent in view of FIG. 3 and the description above, a precise execution point (a measure of progress of VM 200 from an initial state) can be uniquely defined by the tuple {eip, BrCnt, ecx}. Accurately tracking this tuple provides a reliable timing mechanism to tag external events for logging and replay.

Figure 4:
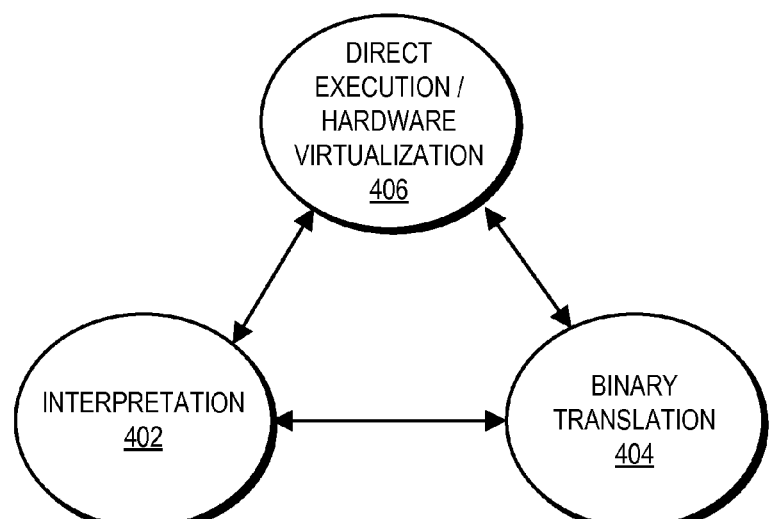
FIG. 4 is a state transition diagram illustrating operating modes of a virtual machine.

Turning now to FIG. 4 a state transition diagram illustrates operating modes of VM 200 (shown in FIG. 2) in accordance with one embodiment. VM 200 can operate in one of three execution modes: interpretation 402, binary translation 404, and direct execution or hardware virtualization (DE/HV) 406. In interpretation mode 402, also referred to as "emulation," VMM 300 decodes guest instructions and emulates an instruction via a sequence of instructions that are executable on host system 100. In binary translation mode 404, blocks of guest instructions are translated and stored in a translation cache (not shown). Because translated instructions can be accessed from the translation cache in subsequent iterations, binary translation mode 404 typically has less software overhead and offers higher performance than interpretation 402. In DE/HV mode 406, guest instructions are executed directly on host system hardware 100. DE/HV mode typically offers the highest performance. In some embodiments, direct execution and hardware virtualization can be considered two distinct execution modes. Direct Execution (DE) generally refers to executing guest instruction directly on processors that lack hardware virtualization features. Hardware Virtualization (HV) denotes executing guest instruction directly on processors equipped with hardware virtualization features such as Intel VT-x or AMD-V. Because similar methods are applied using direct execution and hardware virtualization, DE and HV modes are grouped together in the discussion that follows except where otherwise noted.

Virtualization software 600 (FIG. 2) can dynamically switch VM 200 between execution modes during execution of guest instructions. Furthermore, virtualization software 600 maintains tracking of the execution point as it switches between execution modes. During record and replay, virtualization software 600 tracks the execution point as guest instructions execute. In one embodiment, this is performed within a VMM or analogous component of the virtualization software. In both logging and replay, methods for tracking the execution point in interpretation mode 402 and binary translation mode 404 generally involves the use of software counters that update after execution of each instruction or set of instructions. Method for logging and replay in interpretation mode 402 and binary translation mode 404 are described in further detail in U.S. Provisional Application No. 60/985,929 entitled "Using Branch Instruction Counts to Facilitate Replay of Virtual Machine Instruction Execution," filed on Nov. 6, 2007. Methods for logging and replay in DE/HV mode 406 are now described in more detail. In DE/HV mode 406, VM 200-1 executes guest instructions directly on the system hardware 100.

Figure 5:
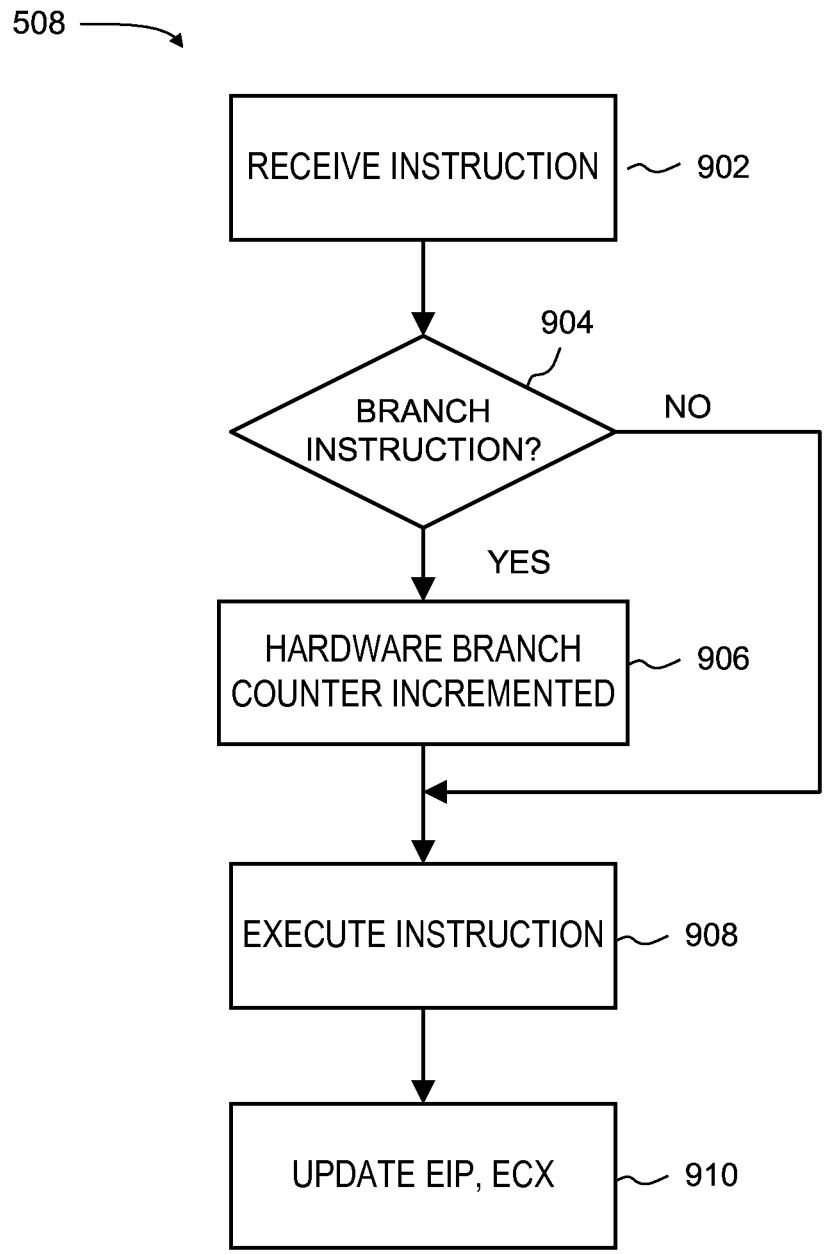
FIG. 5 is a flowchart depicting an exemplary method for executing instructions and tracking an execution point in direct execution/hardware virtualization mode.

A method for executing 508 instructions and updating the execution point in direct execution/hardware virtualization (DE/HV) mode is illustrated in FIG. 5. When executing in DE/HV mode, a precise branch count is maintained using one or more performance counters (e.g. counters 276, 278) or a similar hardware resource that can be configured to count branch instructions. Modern processors generally provide this capability. In a typical procedure, an instruction is received in operation 902. In operation 904, the host system 100 determines if the instruction is a branch instruction. If the instruction is a branch instruction, the procedure flows to operation 906 wherein the hardware counter automatically increments. If the instruction is not a branch instruction, operation 906 is skipped and the procedure flows directly to operation 908 wherein the instruction is executed. In operation 910 thereafter, the instruction pointer is incremented. The iteration counter may be changed by the instruction, but it is not guaranteed to be changed, e.g., string instructions decrement ecx. In one embodiment, performance counters 276, 278 described above with reference to FIG. 2 correspond to the instruction pointer (eip) and iteration counter (ecx), which are stored in hardware registers of the host processor 110 and can be read by virtualization software 600.

Figure 6:
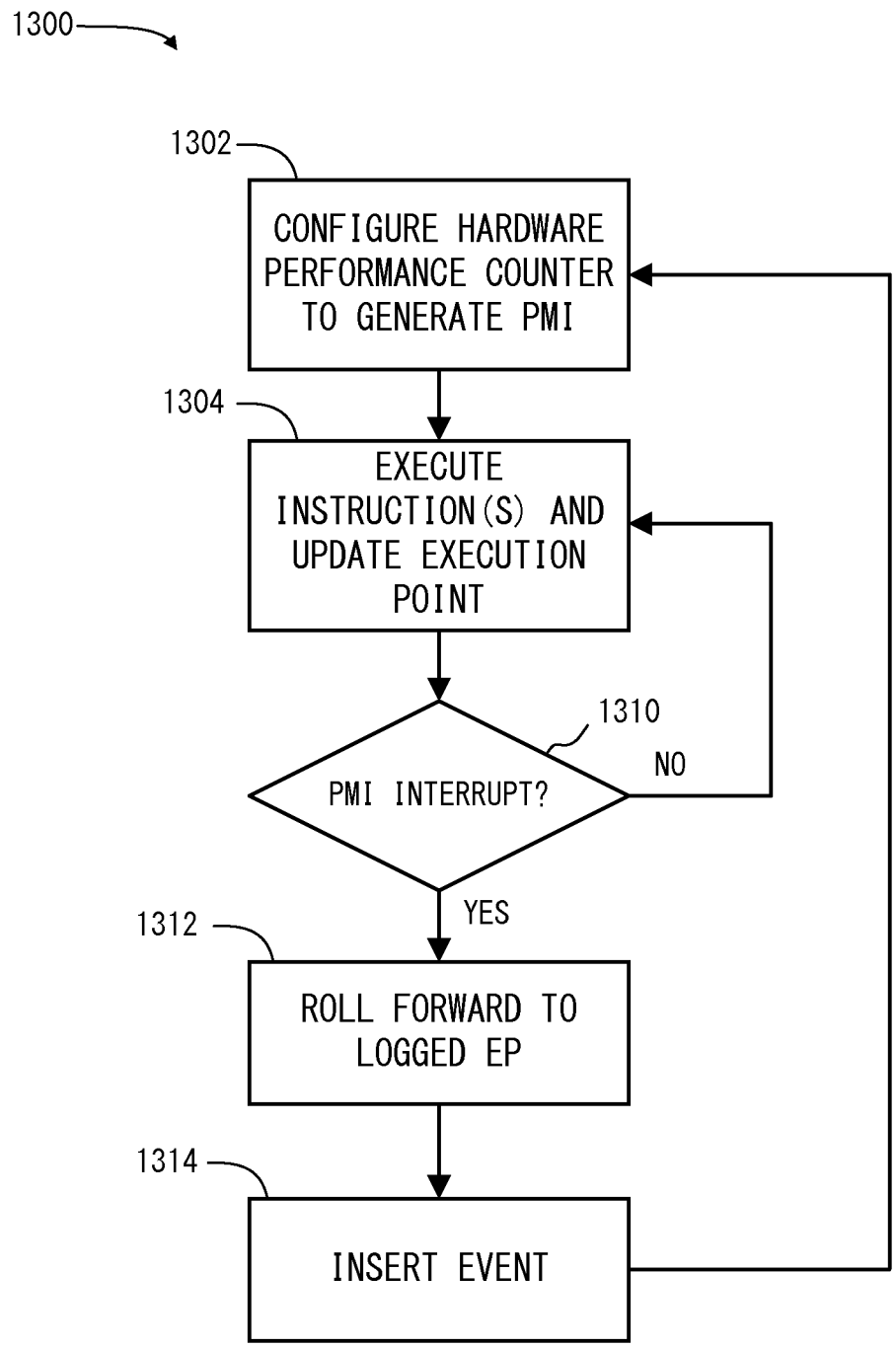
FIG. 6 is a flowchart illustrating an embodiment of a method for replaying execution in direct execution/hardware virtualization mode.

FIG. 6 shows a flowchart 1300 illustrating by way of example a method for replaying execution in DE/HV mode. In one embodiment, hardware performance counters (276, 278 of FIG. 2) are enabled when entering DE/HV mode 406 and disabled upon exiting DE/HV mode. In operation 1302, when entering DE/HV mode, performance counters 276, 278 are configured to count executed branch instructions. In one embodiment, first performance counter 276 (FIG. 2) may be configured to generate a "performance monitoring interrupt" (PMI) on a performance counter overflow. For certain architectures, performance counters are configured with a negative value equal to a target number of branch instructions. This target branch count is typically less than or equal to the branch count of the next logged event in the event log. When the counter reaches zero, this signifies that the number of replayed branch instructions equals the number of branches corresponding to the target execution point and the overflow interrupt is triggered. Hardware processor 110 executes the instructions and updates the execution point in operation 1304. As described above, if the instruction is a branch instruction, first hardware counter 276 automatically updates.

System level software, i.e., virtualization software 600, receives interrupts generated by the processor. Execution of the VM is suspended when handling interrupts. The virtualization software identifies the interrupt in operation 1310. If the interrupt is not a PMI interrupt, then the virtualization software handles the interrupt as necessary and continues execution in operation 1304. However, if the interrupt is a PMI interrupt, the procedure flows to operation 1312 wherein an interrupt routine changes the execution mode of the VM to interpretation or binary translation modes whereupon the VM "rolls forward" until the matching execution point is reached. Alternatively, execution may be continued with DE/HV using hardware breakpoints to interrupt the guest when it executes instruction at the logged instruction pointer (eip) of the logged event execution point. In operation 1314, the logged event is injected as previously described. After injection, the procedure may return to operation 1302 whereupon the VM is returned to DE/HV mode and hardware performance counters are reconfigured for the next logged nondeterministic event.

In order to maintain accurate tracking of the execution point, virtualization software 600 may distinguish between branches caused by guest execution and branches cause by unrelated host activity. Methods for precisely counting guest branch instructions in DE/HV mode are now described by way of example with reference to FIGS. 7-11. In one embodiment, branch instructions are counted in DE/HV mode using hardware performance counters 276, 278 in the host system 100 that can be configured to count branch instructions associated with a current privilege level (CPL) of an execution thread. The CPL refers to the level of resource protection associated with a particular thread. For example, the privilege level may control access to privileged instructions and operations, I/O ports, etc. In x86 architecture, there are 4 privilege levels ranging from CPL0-CPL3 with CPL0 being the most privileged. Typically, a VM executes in DE/HV mode at CPL3 while virtualization software 600 operates at CPL0.

For example, first performance counter 276 can be configured to count only CPL3 branch instructions. Thus, in the general case, branch instructions executed by virtualization software 600 or unrelated host system 100 (operating at CPL0) are not counted by first performance counter 276. When a branch instructions transfers control between privilege levels, performance counters 276, 278 are designed to count the branch instruction according to the destination CPL. Thus, when control is transferred to DE/HV mode (e.g., from virtualization software 600), performance counter 276 counts a CPL3 branch instruction that is not actually caused by guest execution. Since most control transfers involve transfer to or from virtualization software 600, the virtualization software can adjust the guest branch count accordingly. For example, virtualization software can decrement the branch count by 1 prior to transitioning to DE/HV mode.

However, when control transfers do not involve virtualization software 600, distortion can be introduced into the branch count. For example, a control transfer to CPL3 that does not originate from virtualization software 600 will be counted as a guest branch instruction even though the branch may not actually be caused by guest execution. This distortion causes errors in the logging and replay system because the tracked execution point is no longer reliable.

One common type of control transfer that can introduce distortion into the branch count occurs from the execution of System Management Mode (SMM) tasks by the host processor 100. SMM is a super-privileged operating mode (CPL0) that is used for various "housekeeping" tasks such as, for example, power management operations, system safety functions, and system configuration tasks. These tasks are designed to be transparent to software including virtualization software 600 and other system-level software. Host system 100 enters SMM via an SMM system management interrupt (SMI). After executing SMM tasks in an SMI handler, an RSM instruction (resume from SMM) exits SMM and restores the state of VM 200 to the state when the SMI was triggered. In many x86 architectures, the SMM handler is a part of the OEM supplied firmware (e.g. BIOS) and is generally outside of control of system-level software.

The transfer to SMM via the SMI and return from SMM via RSM are treated similarly to other control transfers. The SMI dispatch to SMM is counted as a CPL0 branch instruction. The RSM is counted as a branch instruction according to the destination privilege level. In the case where DE/HV mode VM execution is interrupted by an SMI, the RSM instruction returns to DE/HV mode 406 (CPL3) and effectively inflates the guest branch instruction by 1. Unlike other hardware interrupts, SMIs are designed to be transparent to system level software such as virtualization software 600. Transitions into and out of SMM are therefore performed directly by hardware 100 and firmware and the SMM handler without the opportunity for intervention by system level software. Thus, virtualization software 600 may be unable to directly detect the RSM instruction in order to compensate for the inflated branch count.

Methods for compensating for inflated branch counts due to system management tasks are described below. Some emerging members of the latest generation of processors have hardware support for automatically disabling performance counters when executing system management tasks. Thus, in these types of processors, system management tasks do not affect the branch count and the compensation techniques described below are not employed. However, this functionality is not available in the majority of currently shipping processors with virtualization extensions. Such processors that lack the counter freeze feature may be treated similarly to the processors without virtualization support. Thus, in the description that follows, reference to DE/HV mode is intended to apply to processors without virtualization support, or processors with virtualization support but still lack hardware support for automatically disabling performance counters when executing SMM tasks.

For processors that lack hardware support for automatically disabling counter when executing SMM tasks, the number of executed RSM instructions can be counted indirectly according to one embodiment. This allows virtualization software 600 to correct the guest branch count so that the branch count reflects only branches caused by guest execution. Thus, virtualization software is still able to maintain a correct and undistorted measurement of the execution point for a VM.

In one embodiment, RSM instructions are indirectly counted by making the SMI visible to virtualization software 600 and adjusting for extra branch counts. SMI instructions can be detected by configuring a second performance counter 278 in the host system 100 to trigger a Performance Monitoring Interrupt (PMI) on a CPL0 branch instruction. The second performance counter 278 is activated when transitioning to VM DE/HV execution from virtualization software 600 execution, and is deactivated on transitions away from VM DE/HV exectuion and to execution of virtualization software 600. The branch count can then be adjusted by virtualization software 600 in the PMI handler when the PMI is dispatched.

Figure 7:
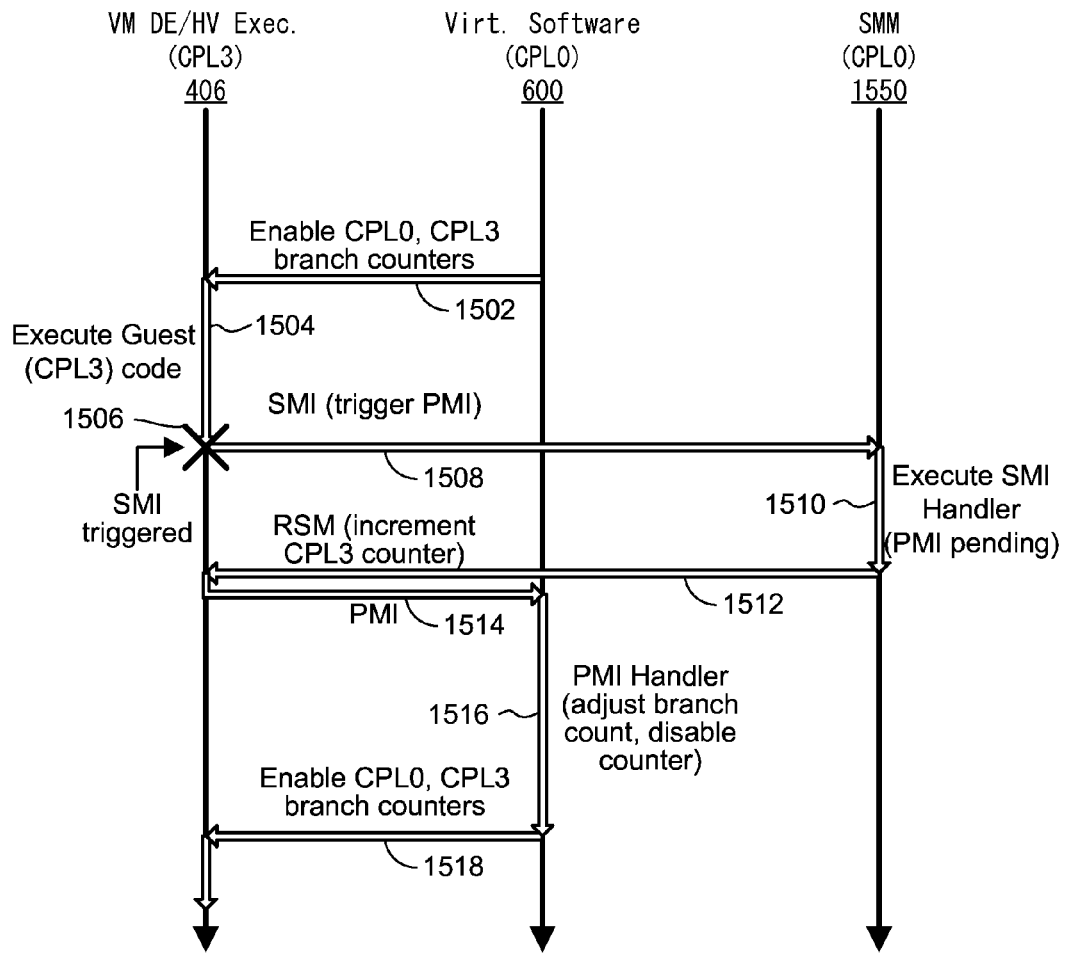
FIG. 7 is an interaction diagram illustrating a first embodiment of counting guest branch instructions in the presence of System Management Mode interrupts.

FIG. 7 is an interaction diagram illustrating an example process for adjusting branch counts in DE/HV mode to compensate for distortion introduced by SMM calls. In the diagram, control of execution switches between virtualization software 600 (executing at CPL0), DE/HV mode 406 (executing at CPL3), and SMM 1550 (executing at CPL0). The example process begins by entering 1502 DE/HV mode 406 from virtualization software 600. When entering DE/HV mode 406, virtualization software 600 enables first performance counter 276 (designated "CPL3 counter" 276) to count CPL3 branch instructions and second performance counter 278 (designated "CPL0 counter" 278) configured to trigger a PMI on a CPL0 branch instruction. Guest code executes 1504 directly in hardware while VM 200 operates in DE/HV mode 406. During execution 1504, CPL3 counter 276 counts guest branch instructions.

At some point 1506 in execution, an SMI is triggered. The SMI 1508 transfers control to SMI handler 1510. The SMI 1508 is detected by CPL0 counter 278 as a CPL0 branch instruction and the counter triggers the PMI. Because the SMI has a higher priority than the PMI, the PMI remains pending until the host system 100 returns from SMM 1550. Host system 100 executes SMI handler 1510 to perform SMM tasks. SMI handler 1510 ends with RSM instruction 1512. RSM instruction 1512 transfers control back to DE/HV mode 406. RSM instruction 1512 is counted as a CPL3 branch and causes CPL3 counter 276 to increment. This inflates the guest branch instruction count by 1. Prior to executing any further guest instructions, host processor 100 detects that the PMI interrupt is pending. The PMI 1514 transfers control back to virtualization software 600. PMI handler 1516 disables the performance counters to stop counting branches. virtualization software 600 can then adjust the branch count within PMI handler 1516 to compensate for the extra branch attributed to the RSM instruction 1512. After PMI handler 1516 terminates, execution again returns 1518 to DE/HV mode 406 and CPL3 counter 276 and CPL0 counter 278 are re-enabled.

In the absence of other pending interrupts, PMI 1514 is dispatched immediately following RSM 1512. However, in the presence of another higher priority interrupt, the PMI can remain pending while the higher priority interrupt is serviced. For most types of host interrupts (other than SMIs), Virtualization software 600 takes control of the interrupt handler. Virtualization software 600 can then identify a pending PMI in the interrupt handler and adjust the branch count accordingly. Alternatively, the PMI can be allocated to the highest priority interrupt vector. This ensures that the PMI is dispatched first following RSM 1512 even in the presence of other external interrupts.

Figure 8:
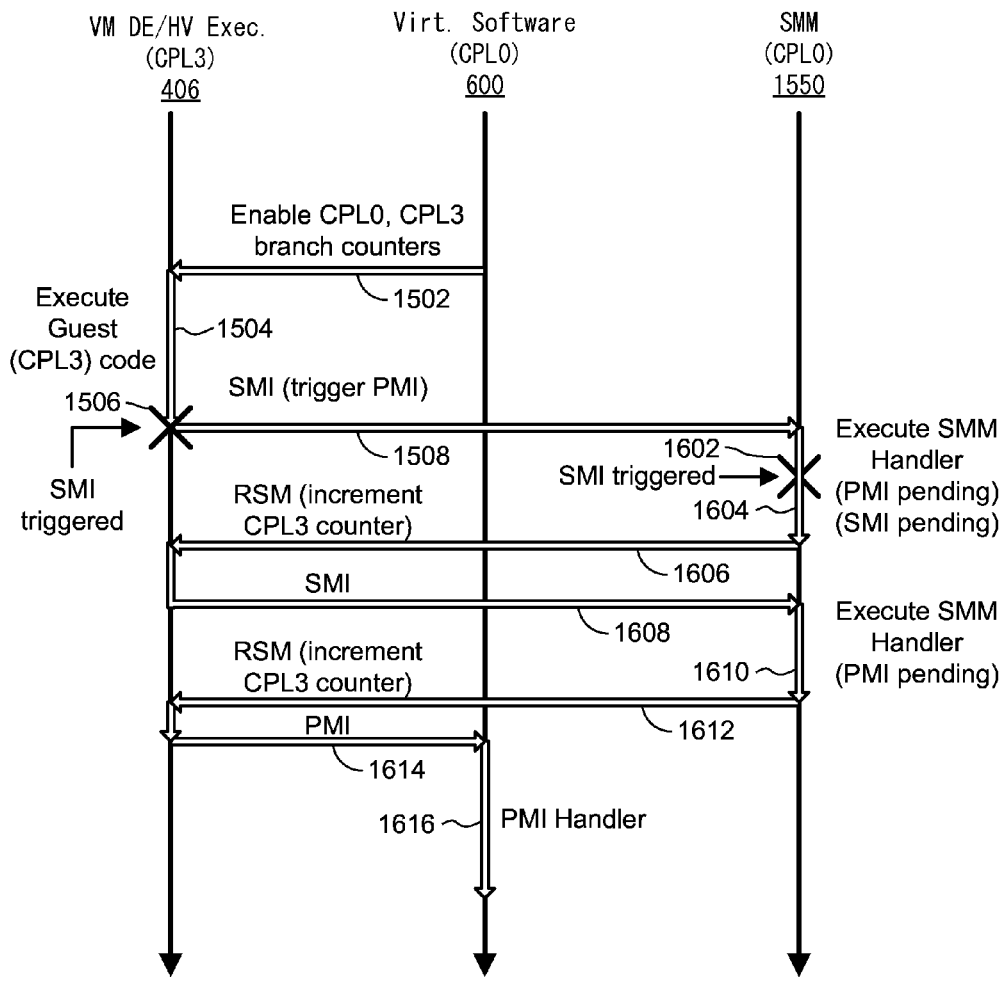
FIG. 8 is an interaction diagram illustrating a second embodiment of counting guest branch instructions in the presence of System Management Mode interrupts.

In many instances PMI handler 1516 compensates for the extra branch count by decrementing the count by 1. However, several sources of complication can cause the branch count to be inflated by 2 or more by the time PMI handler 1516 is executed. FIG. 8 illustrates an interaction diagram with an example of this situation. As described above, virtualization software 600 enables 1502 CPL3 counter 276 and CPL0 counter 278 when transitioning to DE/HV mode 406. Guest code executes 1504 until an SMI is triggered 1506. The SMI triggers the PMI 1508 and transitions control to SMM 1550. In this example, a second SMI triggered 1602 on the same guest instruction (but not necessarily on the same host instruction). For example, the second SMI may trigger 1602 during execution of the SMI handler 1604. In this case, when RSM 1606 is executed, both the PMI and the second SMI are pending. The second SMI has higher priority than the PMI and is delivered 1608 immediately after RSM 1606 without notifying virtualization software 600. SMI handler 1610 is executed with the PMI still pending. RSM 1612 from the second SMI call 1608 is executed to return from SMM 1550. This subsequent RSM 1612 is also counted by CPL3 counter 276 and the branch count is now inflated by two. Additional SMIs may also be triggered on the same guest instruction, inflating the branch count further. If no additional higher priority interrupts are pending, PMI 1614 is eventually delivered to virtualization software 600. However, the guest branch instruction is now inflated by two or more when the PMI handler 1616 executes.

Figure 9:
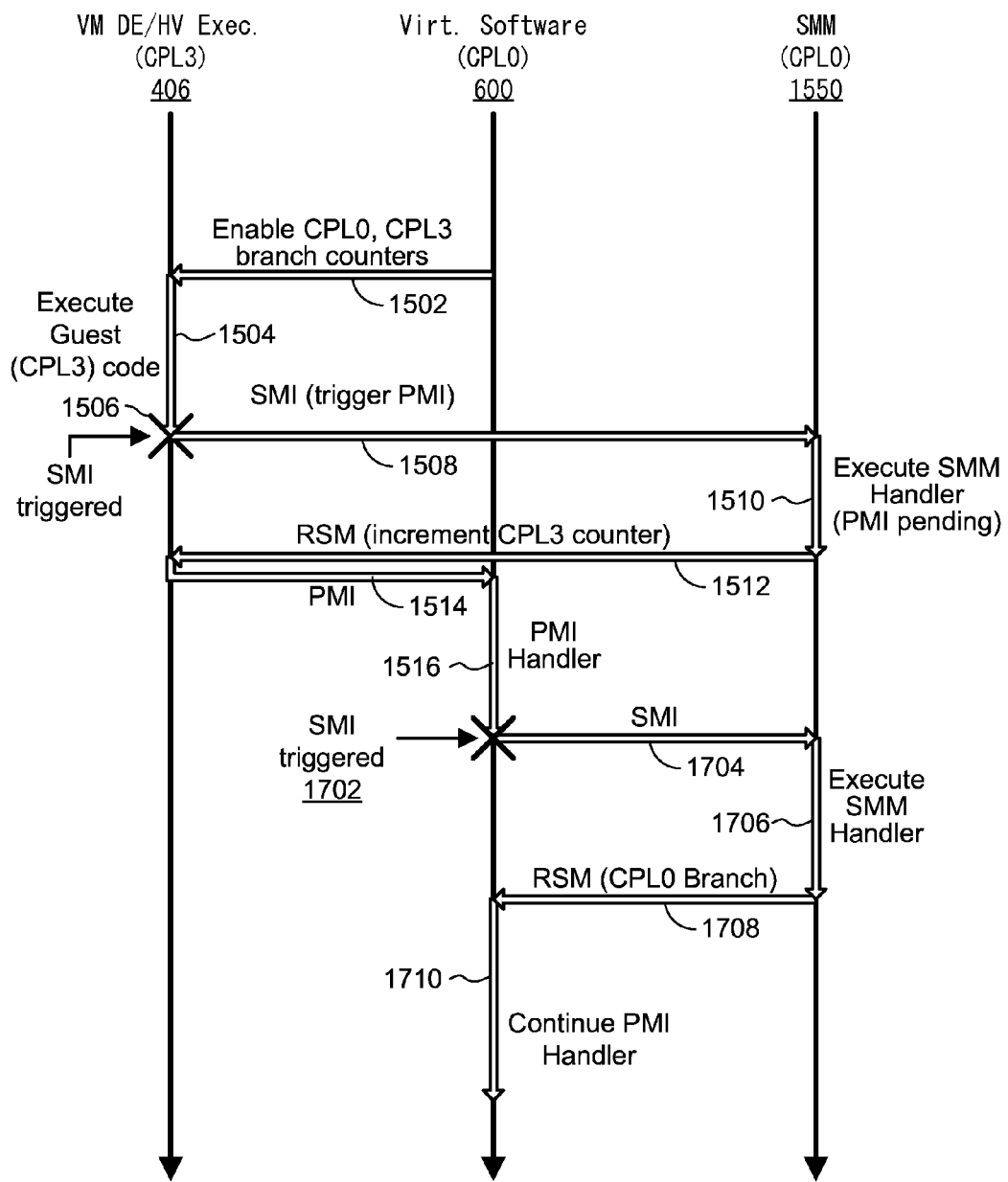
FIG. 9 is an interaction diagram illustrating a third embodiment of counting guest branch instructions in the presence of System Management Mode interrupts.

An additional complication occurs because not every subsequent SMI inflates the guest branch count. Rather, if the subsequent SMI occurs when virtualization software is handling the PMI, but has not disabled PMIs yet, the branch is not counted by CPL3 counter 276. An example of this situation is illustrated in FIG. 9. Steps 1502-1516, are executed similarly to steps described above with reference to FIG. 15. While the PMI handler 1516 is executing, a subsequent SMI triggers at 1702. The SMI 1704 transfers control from virtualization software 600 to SMM 1550. SMI handler 1706 executes and RSM instruction 1708 returns to virtualization software 600. In this case, the second RSM 1708 does not increment the CPL3 counter 276 because RSM instruction 1708 returns to the virtualization software 600. Thus, the branch is counted as a CPL0 branch instruction. Following the RSM instruction 1708, the PMI handler continues to execute at 1710.

Figures 10, 11:
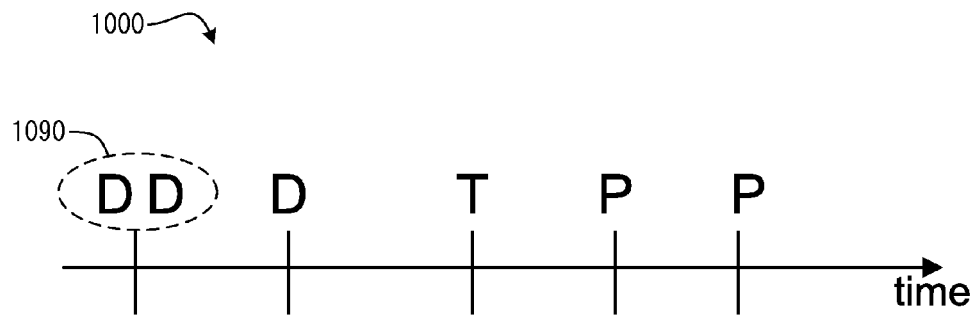
FIG. 10 is timeline illustrating examples of interrupt events that affect branch counting.
FIG. 11 is an embodiment of a last branch recording table for use with counting branch instructions.

In order to produce accurate guest branch counts, virtualization software should be able to count all SMIs triggered in DE/HV mode 406 including multiple SMIs on the same guest instruction as illustrated in the example of FIG. 8. Furthermore, VMM 300 should ignore SMIs received after leaving DE/HV mode as illustrated in the example of FIG. 9. FIG. 10 shows by way of example a timeline 1000 conceptually illustrating the types of events that the PMI handler should distinguishes between. Certain events are identified by capital letters and corresponding instructions for each event are illustrated by a vertical line. Events D represent an SMI triggered while executing in DE/HV mode 406. Multiple events D 1090 may trigger on the same guest instruction as illustrated in the example of FIG. 8. The event T represents the transition from DE/HV mode 406 to VMM 300 (CPL3 to CPL0 transition) on the PMI. Events P represent SMIs triggered during the PMI handler (CPL0) prior to PMIs being disabled as illustrated in the example of FIG. 9. To produce an accurate guest branch count, virtualization software 600 should be able to identify event T, count the number of events D, and ignore events P. Then virtualization software can adjust the guest branch count in the PMI handler according to the number of events D.

In one embodiment, PMI handler achieves these goals by utilizing information from last branch recording (LBR). Many modern processors (e.g., Intel Pentium 4, Core, and Core 2 processors) provide support for LBR. When LBR is enabled, the processor records a running trace of the most recently taken branches, interrupts, and/or exceptions. This information is stored in a fixed size LBR stack in the host system 100. The records on the stack indicate branch source and destination addresses in several formats for a fixed number of most recent branch instructions. For example, each LBR record may have the structure {fromAddr, toAddr} representing the branch source and destination addresses respectfully. An RSM instruction leaves a single record on the LBR stack: {smiAddr, smiAddr} representing an address of the particular instruction that was interrupted by the SMI. When the PMI is delivered to virtualization software 600, the SMI address (smiAddr) is equal to a DE/HV mode address interrupted by the PMI (pmiAddr). In one embodiment, LBR is enabled when transitioning into DE/HV mode 406 and LBR is disabled when transitioning out of DE/HV mode 406.

In the PMI handler, virtualization software 600 examines records in the LBR beginning with the most recent branch information to identify the above described events. An example LBR table 1900 is illustrated in FIG. 11. The PMI handler identifies the 'T' event (the transition to the virtualization software 600 from DE/HV mode 406) by finding the entry 1906 in the LBR table 1900 with a source address of the instruction interrupted by the PMI (pmiAddr) and the destination address of the PMI handler. Recorded branches 1902, 1904 more recent than event 'T' having a virtualization software address (e.g., vmmAddr) as a source and destination are identified as 'P' events and are ignored. No adjustment to the guest branch instruction count is made for entries 1902, 1904. Recorded branches 1908, 1910 prior to the 'T' event having the PMI address as the source and destination are recognized as 'D' events. The number of D events are subtracted from the CPL3 count to obtain the accurate guest branch instruction count. This scheme enables guest DE instructions to execute at hardware speed. The LBR is read in the PMI handler only when one or more SMIs are dispatched.

Although the above method handles the most common cases, the method may occasionally be insufficient in the rare cases of a continuous SMI stream where, for example, the number of SMIs on the same guest instruction exceeds the depth of the LBR stack. In these rare cases, alternative approaches can be taken as described below.

In one embodiment, when the LBR scheme proves insufficient, virtualization software 600 can revert to a previous state of the VM 200 based on information in the event log 280 or stored elsewhere by the virtualization software 600. For example, some logging/replay systems may employ rolling checkpoints where the VM state is captured and stored at regular intervals. Given two successive checkpoints, a VM 200 that replays execution from the first checkpoint will eventually arrive at the next checkpoint.

In one embodiment, the PMI handler determines when the LBR table has insufficient data to reliably adjust the guest branch count. For example, it may be determined that the LBR table is insufficient when the last entry 1910 (i.e. the least recent entry) in the LBR table is a D event (an SMI triggered in DE/HV mode 406). In this case, the VM 200 can revert to the previous checkpoint and replay events from the event log to create a "partial replay" of the execution. During logging, in-progress asynchronous I/O may be carefully handled when executing the partial replay. In logging, guest external outputs such as outgoing network packets are made visible to the outside world. However, during replay, the outgoing packets are dropped. For partial replay, output completions that have already been made visible outside during initial execution are dropped. However, an in-progress I/O that has been initiated during logging, but has not completed is re-issued and fully re-executed during partial replay.

In an alternative embodiment, virtualization software 600 can employ software emulation of a sequence of instructions starting with the guest instruction having the unknown SMI count. During logging, virtualization software 600 detects an instruction with an unknown SMI count (e.g., when the last entry 1910 of the LBR table is a D event). Upon detection of such an instruction, a log entry is generated that indicates a possible inaccuracy in the current branch count. Virtualization software 600 then emulates a bounded number of guest instructions continuing from the instruction with the unknown count. While emulating, virtualization software 600 computes a signature (hash value) of the executing instruction sequence. Parameters used for a hash computation may include, for example, the instruction pointer (eip) of executed instructions, code bytes, register state after each instruction, memory bytes read or written, external I/O generated, etc. The instruction sequence signature is then stored in the log entry together with a reference to the instruction having the unknown SMI count.

During replay, virtualization software switches from DE/HV mode 406 to interpretation mode 402 (or alternatively binary translation mode 404) prior to reaching the instruction with the unknown SMI count. Signature computation is enabled each time the instruction with the unknown SMI count is executed until an instruction sequence is reached that results in the same signature as the signature computed during logging. Alternatively, a hardware breakpoint might be used to transfer control to virtualization software 600 each time an instruction with an ambiguous SMI count is executing. This would also initiate a signature computation for an instruction sequence and the process stops on a signature match. The delta between logging and replay branch counts is computed and used as compensation to the guest branch instruction count in subsequent replay. This scheme could be made increasingly more accurate by selecting a longer execution sequence and/or applying richer signature computation functions at the risk of reduced performance.

Figure 12:
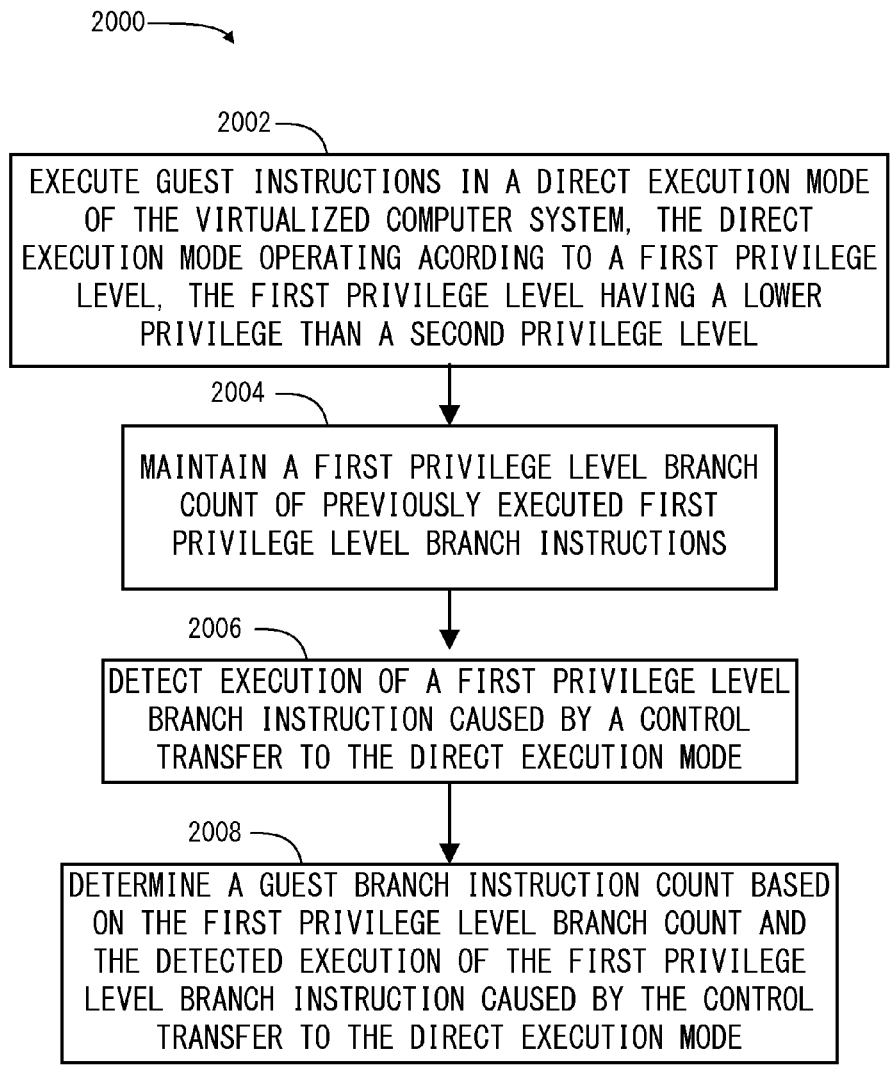
FIG. 12 is a flowchart illustrating a method for counting guest branch instructions in a virtualized computer system.

With reference now to FIG. 12, showing flowchart 2000, a method is illustrated for counting guest branch instructions in a virtualized computer system. Step 2002 comprises executing guest instructions in a direct execution mode of the virtualized computer system, the direct execution mode operating according to a first privilege level, the first privilege level having a lower privilege than a second privilege level. Step 2004 comprises maintaining a first privilege level branch count of previously executed first privilege level branch instructions. Step 2006 comprises detecting execution of a first privilege level branch instruction caused by a control transfer to the direct execution mode. Step 2008 comprises determining a guest branch instruction count based on the first privilege level branch count and the detected execution of the first privilege level branch instruction caused by the control transfer to the direct execution mode.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for counting guest branch instructions in a virtualized computer system having a virtualization layer, the method comprising:
    entering direct execution mode of the virtualized computer system from the virtualization layer;
    executing guest instructions in the direct execution mode of the virtualized computer system, the direct execution mode operating according to a first privilege level, the first privilege level having a lower privilege than a second privilege level according to which the virtualization layer operates;
    maintaining a first privilege level branch count of executed first privilege level branch instructions while executing the guest instructions in the direct execution mode; and
    upon a first interrupt that is transparent to the virtualization layer occurring and being processed by a first interrupt handler at a privilege level higher than the first privilege level and returning from the first interrupt handler to execute the guest instructions in the direct execution mode, triggering a second interrupt, which is processed in a second interrupt handler to adjust the first privilege level branch count, wherein
    adjusting the first privilege level branch count includes determining a number of previously executed first privilege level branch instruction caused by control transfers to the direct execution mode, and decrementing the first privilege level branch count by the determined number of previously executed first privilege level branch instructions.

2. The method of claim 1, wherein:
    upon entering the direct execution mode, configuring a second privilege level counter so that the second interrupt is triggered in response to returning from the first interrupt handler; and
    responsive to the second interrupt being triggered, determining that a first privilege level branch instruction caused by a control transfer to the direct execution mode was executed, wherein the first privilege level branch instruction is a resume instruction.

3. The method of claim 1, wherein the maintaining of the first privilege level branch count comprises:
    configuring a first privilege level counter to count first privilege level branch instructions;
    enabling the first privilege level counter when entering the direct execution mode; and
    disabling the first privilege level counter when exiting the direct execution mode.

4. The method of claim 1, wherein determining the number of previously executed first privilege level branch instructions caused by the control transfers to the direct execution mode comprises:
    receiving information stored in a last branch recording (LBR) table; and
    determining how many entries in the LBR table represent control transfer branches from the mode operating according to the higher privilege level to the direct execution mode.

5. The method of claim 1, wherein the virtualized computer system includes a system management mode that executes at the higher privilege level, the first privilege level branch instruction being a resume instruction from the system management mode.

6. The method of claim 1, further comprising:
    tracking a current execution point of the executing guest instructions, the current execution point being based in part on the first privilege level branch count; and
    responsive to detecting the occurrence of an external I/O event, logging the event as an entry in an event log together with the current execution point associated with the external I/O event.

7. The method of claim 1, further comprising:
    tracking a current execution point of the executing guest instructions, the current execution point being based in part on the first privilege level branch count;
    comparing the current execution point to a logged execution point of an I/O event stored in an event log; and inserting the logged I/O event from the event log into the execution when the current execution point matches the logged execution point.

8. A computer program product stored on a non-transitory computer readable storage medium and configured to cause a virtualized computer system to perform a method for counting guest branch instructions, the method comprising:
  entering direct execution mode of the virtualized computer system from the virtualization layer;
  executing guest instructions in the direct execution mode of the virtualized computer system, the direct execution mode operating according to a first privilege level, the first privilege level having a lower privilege than a second privilege level according to which the virtualization layer operates;
  maintaining a first privilege level branch count of executed first privilege level branch instructions while executing the guest instructions in the direct execution mode; and
  upon a first interrupt that is transparent to the virtualization layer occurring and being processed by a first interrupt handler at a privilege level higher than the first privilege level and returning from the first interrupt handler to execute the guest instructions in the direct execution mode, triggering a second interrupt, which is processed in a second interrupt handler to adjust the first privilege level branch count, wherein
  adjusting the first privilege level branch count includes determining a number of previously executed first privilege level branch instructions caused by control transfers to the direct execution mode, and decrementing the first privilege level branch count by the determined number of previously executed first privilege level branch instructions.

9. The computer program product of claim 8, wherein:
  upon entering the direct execution mode, configuring a second privilege level counter so that the second interrupt is triggered in response to returning from the first interrupt handler; and
  responsive to the second interrupt being triggered, determining that a first privilege level branch instruction caused by a control transfer to the direct execution mode was executed, wherein the first privilege level branch instruction is a resume instruction.

10. The computer program product of claim 8, wherein the maintaining of the first privilege level branch count comprises:
  configuring a first privilege level counter to count first privilege level branch instructions;
  enabling the first privilege level counter when entering the direct execution mode; and
  disabling the first privilege level counter when exiting the direct execution mode.

11. The computer program product of claim 8, wherein determining the number of previously executed first privilege level branch instructions caused by the control transfers to the direct execution mode comprises:
  receiving information stored in a last branch recording (LBR) table; and
  determining how many entries in the LBR table represent control transfer branches from the mode operating according to the higher privilege level to the direct execution mode.

12. The computer program product of claim 8, wherein the virtualized computer system includes a system management mode that executes at the higher privilege level, the first privilege level branch instruction being a resume instruction from the system management mode.

13. The computer program product of claim 8, further comprising:
  tracking a current execution point of the executing guest instructions, the current execution point being based in part on the first privilege level branch count; and
  responsive to detecting the occurrence of an external I/O event, logging the event as an entry in an event log together with the current execution point associated with the external I/O event.

14. The computer program product of claim 8, further comprising:
  tracking a current execution point of the executing guest instructions, the current execution point being based in part on the first privilege level branch count;
  comparing the current execution point to a logged execution point of an I/O event stored in an event log; and
  inserting the logged I/O event from the event log into the execution when the current execution point matches the logged execution point.

* * * * *